J. E. SINGLETON & S. T. WHITE.
SHUTTER OPERATING ATTACHMENT FOR TWIN MOTION PICTURE MACHINES.
APPLICATION FILED JULY 10, 1916.

1,229,159.

Patented June 5, 1917.
2 SHEETS—SHEET 1.

Witnesses:
Benjamin B. Dowell
Mary E. Heller

Inventor
James E. Singleton
Samuel T. White
By Julian C. Dowell
their Attorney

UNITED STATES PATENT OFFICE.

JAMES E. SINGLETON AND SAMUEL T. WHITE, OF GREENVILLE, NORTH CAROLINA.

SHUTTER-OPERATING ATTACHMENT FOR TWIN MOTION-PICTURE MACHINES.

1,229,159.

Specification of Letters Patent. Patented June 5, 1917.

Application filed July 10, 1916. Serial No. 108,349.

*To all whom it may concern:*

Be it known that we, JAMES E. SINGLETON and SAMUEL T. WHITE, citizens of the United States, residing at Greenville, in the county of Pitt and State of North Carolina, have invented certain new and useful Improvements in Shutter-Operating Attachments for Twin Motion-Picture Machines; and we do hereby declare the following to be a full, clear, and exact description of the invention, such as will enable others skilled in the art to which it appertains to make and use the same.

This invention relates to apparatus for the simultaneous control of the respective shutters of two motion picture machines for shutting off or turning on the light rays from or to the screen, respectively, where the motion picture machines, as in any ordinary picture house, are adjacent. This device is a labor saving one and dispenses with the necessity for two operators, one for each machine, as now required, and also with the necessity for a helper, which is usually necessary in the manipulation of two machines used in projecting pictures in a continuous performance and for the running of several reels consecutively. It is the custom in the production of a photoplay of two or more reels for one of these machines to be in operation running for the first reel while the second one is being focused and the film placed therein so that at the completion of the first reel the second machine is immediately put into operation and the first one cut off. To produce a continuous performance with as little interruption as possible between the two reels it has heretofore been necessary to have an operator for each machine, one of which operators may be idle while the other operator's machine is in action. At the end of the first reel when one "flash" passes on the reel it is a sign that the reel is near its end and the other operator is then called to his machine to take up the next reel in order, as soon as the first reel is passed off. Between the end of the first and the beginning of the second reel there is some loss of time and an interruption of the photoplay which loss and interruption are avoided by our invention which enables one operator to control two machines simultaneously, effecting an instantaneous change of reels at the desired interval of time, and an uninterrupted performance. Our invention has the further advantage of being simple and inexpensive in manufacture, and is readily attachable for connecting two standard motion picture machines at a nominal expense to adapt them to be operated by a single attendant.

The invention will first be hereinafter more particularly described, with reference to the accompanying drawings, which form a part of this specification, and then pointed out in the claims at the end of the description.

In said drawings.

Figure 1:
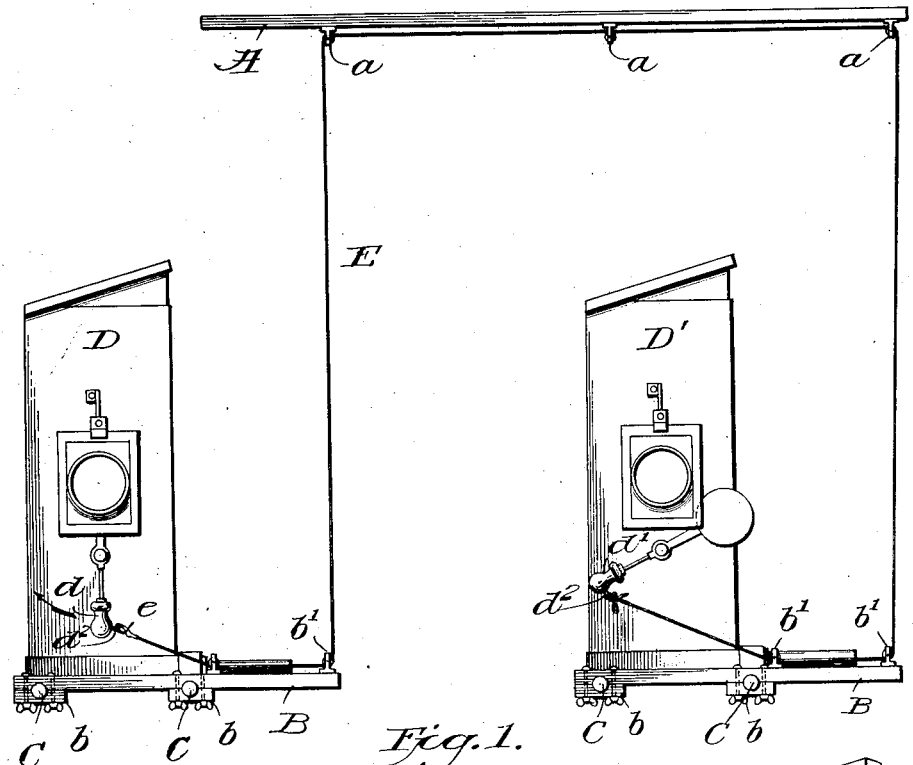
Figure 1 is a front elevation showing the lamp houses of two motion picture machines adjacent and provided with our improved device for the simultaneous control of the respective shutters.
Figure 3:
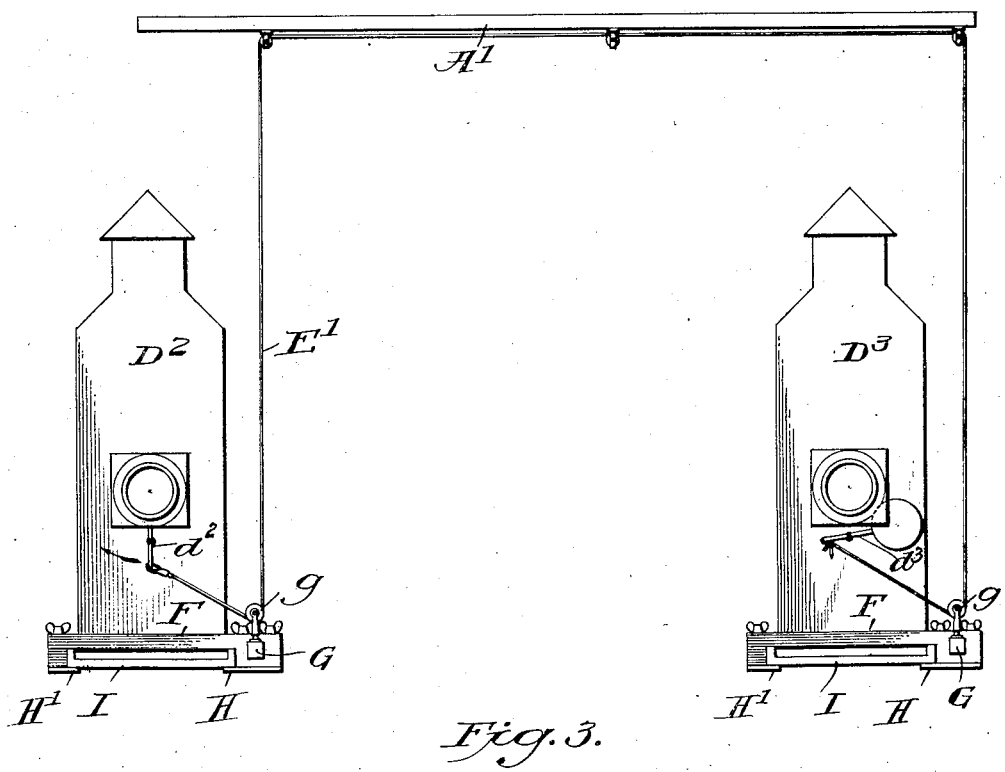
Fig. 3 is a front elevation showing two adjacent machines of a different type from those shown in Figs. 1 and 2 with a modification of our device adapting the same to such different type.

In said drawings A denotes an overhead rod or pole which may be suspended from the ceiling or other support directly over the two machines to be operated and in a position perpendicular to that of the machines with respect to the reflecting screen. The rod or pole A is provided with ordinary fixed grooved pulleys $a$, which may be attached to the under side thereof, one at either extremity and another or others at an intermediate point or points along the pole as may most effectively permit and facilitate the travel of a cord or wire as preferred passing along the pole and over the pulleys and then downwardly from one end-pulley on the pole to the level of or a point suitable for connection with the shutter of the machine with which it is used, as shown in Figs. 1 and 3. The rod A may be formed of any suitable material, such as wood or metal, but is preferably a wooden bar. The letter B denotes a supporting bar which may be adjustably fitted upon and secured to the parallel rods C, C, which support the lamp house of a moving picture projecting machine, for instance, such a machine as the Power's cameragraph. On the under side of the bar B at or near one end and at an intermediate point, are formed semi-circular recesses under which are secured blocks $b$, the opposed faces of which are also recessed coincident with the semi-circular recesses in the bar B so as to form circular openings through which the parallel rods C, C, which support the lamp houses D and $D^1$, respectively, of the motion picture machines may pass and by which the bar B is clamped to said rods; the clamp thus formed being firmly secured to the rods C, C, by means of ordinary bolts having winged or other suitable nuts screwed thereon, as shown. The supporting bar B also carries fixed grooved pulleys $b^1$, one of which may be located near its free end and another or others at an intermediate point or points; said pulleys being similar to those used on the overhead rod or pole A. The recessed portions of the rods or bars B, B, fit over said rods C, C, on the respective machines D and $D^1$ below the shutter-levers $d$ and $d^1$ of said machines; said levers being suspended from the underside of a projecting lens on the lamp house adjacent the picture projecting apparatus. The levers $d$ and $d^1$ may each have an eye-bolt $d^2$ secured thereto for attachment to the ends of the flexible connection E, between the shutter-operating levers of the two machines D and $D^1$, whereby one shutter may be opened as the other is closed and vice versa. To this end, said flexible connection, which may consist of a cord or wire, has secured thereto at one end a snap-hook $e$ or other suitable device for engagement with the eye bolt on one of the shutter-operating levers while the other end of said cord or wire is detachably secured, by tying or otherwise, to the other shutter-operating lever. The intermediate portion of the cord or wire E is passed over the pulleys $a$ on the overhead support and its depending end-portions are each passed under or around the pulleys on one of the supporting bars B and thence to the shutter-operating lever to which it is secured; the cord being of such length or so adjusted that it will hold one shutter open when the other shutter is closed. In operation, assuming that in the machine D the shutter is closed and that the machine $D^1$ is in operation, the respective shutters of the two machines will be in the positions shown in Fig. 1 of the drawings, and if desired to trim the lamp wicks or for other purposes the snap-hook may be disengaged from the lever of the idle machine, without interfering with the operation of the other machine. When the reel in the machine $D^1$ is near the end of the operation the operator has merely to set the machine D in motion and as soon as the end of the film in the machine $D^1$ is reached the operator, by moving the lever $d$ on the machine D in the direction indicated by the arrow, will throw the lever $d^1$ of the machine $D^1$ over so as to close the shutter of that machine and simultaneously open the shutter of the other machine D, thus shutting off the light from one machine and turning on the light in the other machine.

Figure 2:
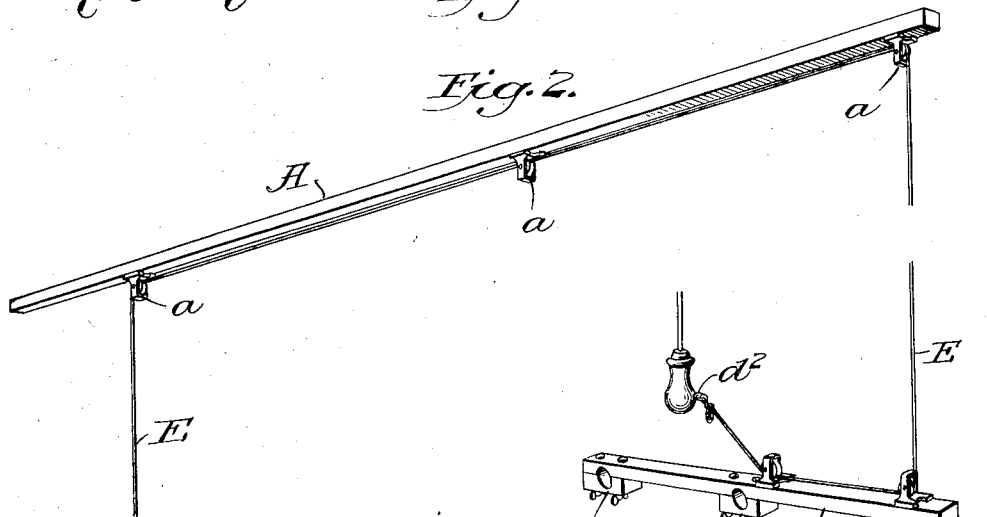
Fig. 2 is a perspective elevation of our improved device disconnected from the machines and showing its adaptability for connection with the shutters of the same.
Figure 4:
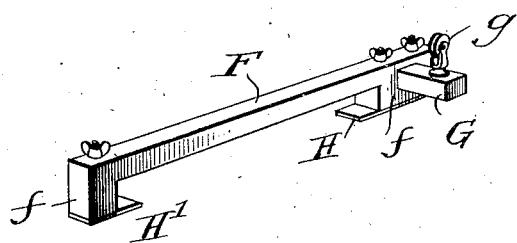
Fig. 4 is a perspective elevation of an attachment used with a machine of the type shown in Fig. 3.

In Figs. 3 and 4 of the drawings we have shown a modification of the invention adapted for use in connection with a different type of machine from that shown in Figs. 1 and 2, for instance, motion picture projecting machines of the type known as the Simplex. This attachment is essentially the same and operates in the same manner as that already described, the difference residing in the construction and mode of attaching the bar which is attached to the lamp house to adapt the attachment for use on machines of a different type from those just described. In said modification the bars which are attached to the lamp houses and which are denoted by the letters F, F, have preferably integral projections or bosses $f$ at each end, one of said projections being preferably of greater width than the other and mortised to receive a tenon projecting from an arm G on which is mounted a fixed grooved pulley $g$ under or around which the cord $E^1$ may pass as described with reference to the form shown in Figs. 1 and 2. Metal plates H and $H^1$ are secured to the bar F, one at each end, underneath the projections or bosses $f$ and project in a direction essentially parallel with the supporting bar, the said metal plates being adjustably secured by means of bolts with winged or other nuts thereon, as shown, or by other means, as desired. The plate $H^1$ may be adjustably and removably secured by means of a single small bolt while two bolts are used to secure the plate H, one on each side of the arm G. This construction is clearly shown in Fig. 4 of the drawings. In Fig. 3 are shown two adjacent motion picture machines of the Simplex type, in which there is a metal plate or pan I interposed between the lamp house and the picture projecting apparatus directly under the projecting lens; said plate having marginal flanges and the bar F is clamped down upon said plate by means of the plates H and $H^1$ and the bolts by which they are secured to the bar F in such position that the arm G projects outwardly from the lamp house and in position parallel with the projecting lens, the nose of which is turned so that the shutter-operating lever projects downwardly instead of upwardly as usual in the Simplex machine. The application of the bar F is similar to that of the supporting bar B of Figs. 1 and 2 and the operation is essentially the same, the object being to illustrate the application of our invention to any ordinary motion picture machine. As shown in Fig. 3, the cord or wire $E^1$ suspended from the pole $A^1$ has both ends dropped down to the level of the supporting base or plate I on the machines $D^2$ and $D^3$ and passes around the pulley $g$ on the bar F and has its ends secured to the shutter-operating levers $d^2$ and $d^3$ of the lamp houses $D^2$ and $D^3$, as described with reference to the machine of the first mentioned form. In operation, the shutter in the machine $D^3$ being open and that in the machine $D^2$ being closed, and the light in the machine $D^3$ being ready to be cut off, the operator has merely to draw the lever $d^2$ in the direction indicated by the arrow, and the lever $d^3$ will be drawn by the cord $E^1$ and will open the shutter of the machine $D^2$ simultaneously with the closing of the shutter of the machine $D^3$.

Having thus described our invention what we claim as new and desire to secure by Letters Patent of the United States is:

1. In combination with a pair of motion picture machines, means flexibly connecting the shutter-operating levers of the two machines, whereby the shutter of one machine may be opened and the shutter of the other machine simultaneously closed, said means extending overhead out of the way of the operator in passing around and between the two machines, and anti-friction devices over or around which said connection passes from one machine to the other.

2. In combination with the shutter-operating levers of two moving picture projecting machines, one shutter being open and the other in closed position, a flexible connection between said levers whereby one shutter may be opened and the other simultaneously closed, and anti-friction devices overhead and adjacent the two machines over or around which said connection passes from one machine to the other.

3. In combination, a pair of moving picture projecting machines, a flexible cord or wire connecting the shutter-operating levers of the two machines, one shutter being open and the other closed, an overhead support for said connection carrying pulleys over or around which said connection passes, and anti-friction devices beside said machines under and around which said connection passes to said shutter-operating levers.

4. In combination with a pair of motion picture machines each having a lamp house with a pendant shutter-operating lever, a flexible cord or wire connecting the said levers, an overhead support carrying anti-friction devices over and around which said cord or wire passes from one machine to the other, and means beside each lamp house carrying anti-friction devices under and around which said cord or wire passes from said overhead support to one of said shutter-operating levers; said cord being detachably secured at each end to one of said levers.

5. An attachment for twin picture projecting machines comprising an overhead support carrying a series of anti-friction devices, a pair of supporting bars each carrying anti-friction devices and adapted for attachment to a pair of rods on which the lamp-house of a picture projecting machine is mounted, and a flexible connection between the shutters of said lamp-houses passing over the anti-friction devices carried by said overhead support and under and around the anti-friction devices carried by said supporting bars and having its free ends detachably secured to said levers.

6. In combination with twin motion picture machines arranged in separated relation and having movable shutters, shutter-operating means connecting the shutters of the two machines, whereby the shutter of one machine is opened and the shutter of the other machine simultaneously closed, for bringing the two machines into operation alternately; said means including a connection which extends overhead from one machine to the other in such manner that the end portions thereof are kept apart and the intermediate portion elevated out of the way of the operator in passing around and between the two machines.

In testimony whereof we affix our signatures in the presence of two witnesses.

JAMES E. SINGLETON.
SAML. T. WHITE.

Witnesses:
BESSIE HASKETT,
H. L. ALLEN.